(12) United States Patent
Song

(10) Patent No.: US 7,974,824 B2
(45) Date of Patent: Jul. 5, 2011

(54) SEISMIC INVERSION OF DATA CONTAINING SURFACE-RELATED MULTIPLES

(75) Inventor: Zhongmin Song, London (GB)

(73) Assignee: WesternGeco L. L. C., Houston, TX (US)

( * ) Notice: Subject to any disclaimer, the term of this patent is extended or adjusted under 35 U.S.C. 154(b) by 931 days.

(21) Appl. No.: 11/771,913

(22) Filed: Jun. 29, 2007

(65) Prior Publication Data

US 2009/0006054 A1 Jan. 1, 2009

(51) Int. Cl.
G06G 7/48 (2006.01)
G03H 3/00 (2006.01)
(52) U.S. Cl. .............................. 703/10; 367/9
(58) Field of Classification Search .............. 703/10; 367/9, 73
See application file for complete search history.

(56) References Cited

U.S. PATENT DOCUMENTS

| | | | |
|---|---|---|---|
| 5,089,994 A | 2/1992 | Harlan et al. | |
| 5,587,965 A | 12/1996 | Dragoset, Jr. et al. | |
| 5,798,982 A * | 8/1998 | He et al. | 367/73 |
| 6,154,705 A * | 11/2000 | McCormack et al. | 702/17 |
| 2003/0110018 A1 | 6/2003 | Dutta et al. | |

OTHER PUBLICATIONS

Shipp et al. Two-dimensional full wavefield inversion of wide-aperture marine seismic streamer data., Geophysical Jornal International, vol. 151, No. 2, Nov. 1, 2002., pp. 325-344.*
Peng et al. 1995., Society of Exploration Geophysicists., "An optimal absorbing boundary condition for elastic wave modeling". p. 296-301.*
Sirgue and Pratt, "Efficient waveform inversion and imaging: A strategy for selecting temporal frequencies," Geophysics, 69( 1):231-248, 2004.
Song, Williamson and Pratt, "Frequency-domain acoustic-wave modeling and inversion of crosshole data: Part II-inversion method, synthetic experiments and real-data results," Geophysics, 60(3):796-809, 1995.
International Searching Authority, PCT/US2008/065815, International Search Report and Written Opinion, dated Apr. 20, 2010, 14 pages.
The International Bureau of WIPO, PCT/US2008/065815, PCT International Preliminary Search Report on Patentability, dated Apr. 27, 2010, 5 pages.
Gerstoft P., "Inversion of Siesmoacoustic and a Posteriori Probability Distributions", The Journal of The Acoustical Society of America, vol. 95, No. 2, Feb. 1, 1994, pp. 770-782.
Brown M. P. and Guitton A., "Least-squares joint imagining of multiples and primaries", Geophysics, vol. 70, No. 5, Sep. 1, 2005, pp. S79-S89.

* cited by examiner

Primary Examiner — Paul Rodriguez
Assistant Examiner — Eunhee Kim

(57) ABSTRACT

To perform seismic inversion, a model representing a subterranean structure is provided. Simulated seismic data is generated using the model, where the simulated seismic data includes surface-related multiples. The model is iteratively updated based on comparing the simulated seismic data with the observed seismic data collected by a seismic survey.

13 Claims, 4 Drawing Sheets

SEISMIC INVERSION OF DATA CONTAINING SURFACE-RELATED MULTIPLES

TECHNICAL FIELD

The invention relates to performing seismic inversion using data that contains surface-related multiples.

BACKGROUND

Seismic surveying is used for identifying subterranean elements, such as hydrocarbon reservoirs, fresh water aquifers, gas injection reservoirs, and so forth. In performing seismic surveying, seismic sources are placed at various locations above an earth surface or sea floor, with the seismic sources activated to generate seismic waves directed into the subterranean structure. Examples of seismic sources include explosives, air guns, or other sources that generate seismic waves.

The seismic waves generated by a seismic source travel into the subterranean structure, with a portion of the seismic waves reflected back to the surface for receipt by seismic receivers (e.g., geophones, hydrophones, etc.). These seismic receivers produce signals that represent detected seismic waves. Signals from seismic receivers are processed to yield information about the content and characteristic of the subterranean structure.

In addition to reflecting from subterranean elements in the subterranean structure, seismic waves can also reflect from a surface (such as a land surface or a sea surface). A seismic wave reflected from the surface is referred to as a surface-related multiple. In a marine environment, a sea surface is present, such that an air-water interface is present. Seismic waves can travel toward the air-water interface, and is reflected back from the air-water interface. In fact, there can be multiple reflections between the air-water interface and the sea floor. The reflected seismic waves that are due to reflection from the sea floor and the reflections from the air-water interface are referred to as surface-related multiples. In land-based applications, surface-related multiples can also be present, caused by multiple reflections between a land surface and a subsurface reflector that are received by a seismic receiver.

Surface-related multiples are generally considered to adversely affect accuracy of seismic processing and interpretation. Conventional techniques attempt to attenuate the surface-related multiples prior to performing seismic waveform inversion. Seismic waveform inversion refers to the process of producing a model of the subterranean structure that minimizes the difference (residuals) between observed seismic data (collected from seismic receivers) and calculated seismic data (calculated from a model).

Attenuating the surface-related multiples from observed seismic data is a pre-processing task that is labor-intensive and computing-intensive. Having to perform the pre-processing task to attenuate surface-related multiples can result in increased processing times for performing waveform inversion.

SUMMARY

In general, according to an embodiment, instead of pre-processing seismic data to remove surface-related multiples, a seismic waveform inversion process enables comparison of simulated seismic data containing surface-related multiples with observed seismic data also containing surface-related multiples. Based on this comparing, a model of a subterranean structure can be iteratively updated.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
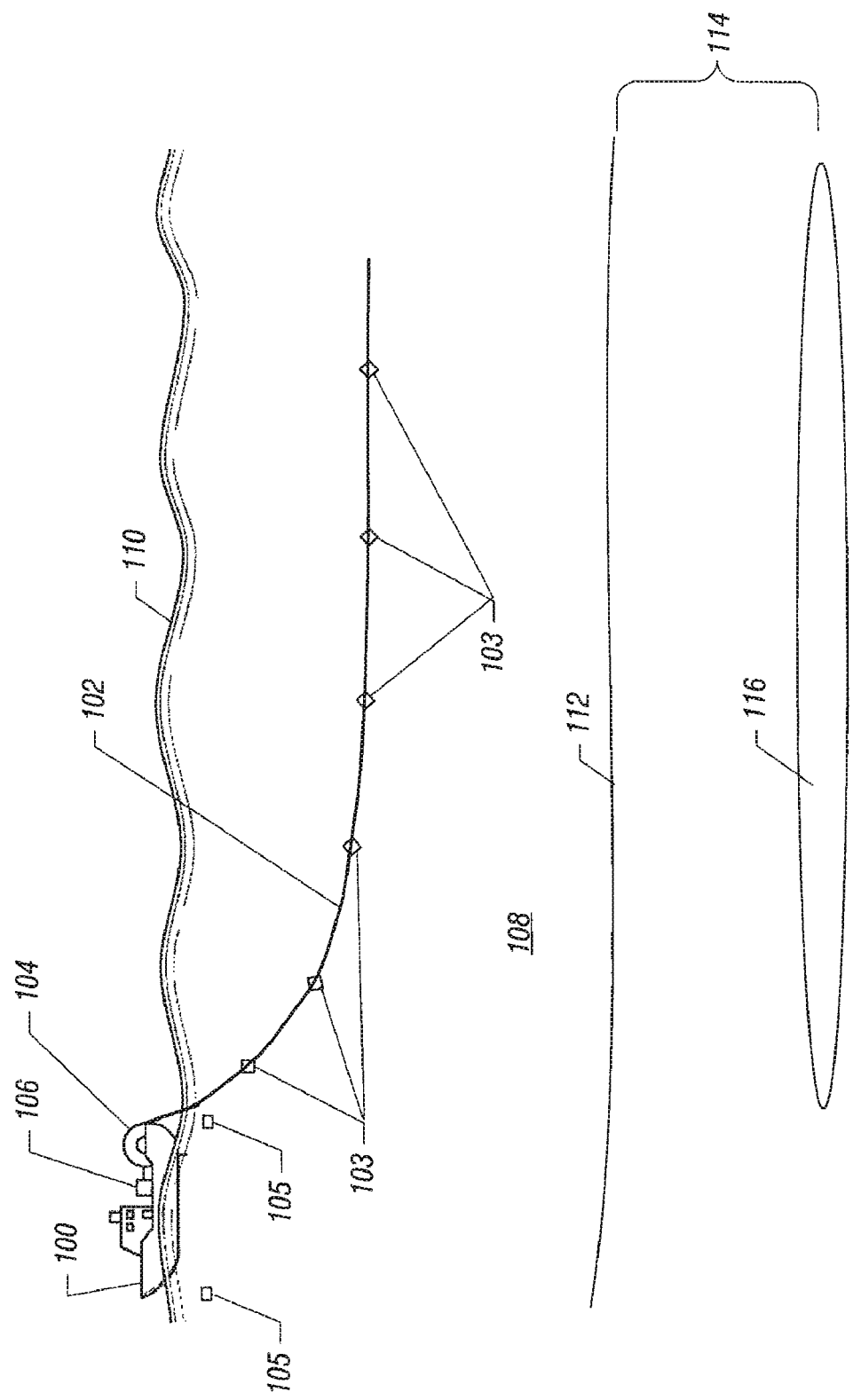
FIG. 1 illustrates a marine arrangement that includes seismic sources and seismic receivers to collect seismic data that is used to perform seismic waveform inversion according to an embodiment.

FIG. 1 illustrates a sea vessel 100 that has a reel or spool 104 for deploying a streamer 102, which is a cable-like structure having a number of seismic sensors or receivers 103 for performing a subterranean survey of a subterranean structure 114 below a sea floor 112. Note that multiple streamers can be towed by the sea vessel 100. The streamer 102 includes receivers 103 that are deployed in a body of water 108 underneath a sea surface 110. The streamer 102 is towed by the sea vessel 100 during a seismic survey operation. In an alternative implementation, instead of using a streamer that is towed in the water by the sea vessel 100, a sealed cable can be used instead, where the sealed cable is deployed from a reel on the sea vessel and laid on the sea floor 112.

Also depicted in FIG. 1 are a number of seismic sources 105 (which can be towed by the same sea vessel or a different sea vessel) that produce seismic signals (source wavefields) propagated into the body of water 108 and into the subterranean structure 114. Examples of seismic sources include air guns, explosives, or other acoustic wave generators. The signals are reflected from elements (e.g., layers) in the subterranean structure 114, including a resistive body 116 that can be any one of a hydrocarbon-containing reservoir, a fresh water aquifer, an injection zone, and so forth. Signals reflected from the resistive body 116 are propagated upwardly toward the seismic receivers 103 for detection by the receivers (and collected as recorded wavefields). Measurement data is collected by the receivers 103, which can store the measurement data and/or transmit the measurement data back to a computer-implemented control system 106 on the sea vessel 100.

In a different example arrangement, land-based surveying can be provided, where seismic sources and seismic receivers are placed on or above a land surface.

In accordance with some embodiments, a seismic waveform inversion technique is provided that uses seismic data in which surface-related multiples are retained. In other words, pre-processing of seismic data for attenuating or removing surface-related multiples is not performed prior to performing seismic waveform inversion. The elimination of pre-processing for attenuating or removing surface-related multiples removes a labor and computing-intensive task that increases processing time. By retaining surface-related multiples in the seismic data, quality of the waveform inversion can also be improved.

Seismic waveform inversion refers to a technique that estimates a quantitative model of a subterranean structure that minimizes or reduces differences between observed seismic data (collected using seismic receivers) and calculated seismic data (generated from a present version of the model). The model is iteratively updated by incrementally improving the model until differences between the observed seismic data and the calculated seismic data is minimized or reduced (or until some other stopping criterion has been satisfied). The model can be a velocity-depth model that models velocities in the subterranean structure at various depths.

In accordance with some embodiments, the waveform inversion technique allows for simulation of surface-related multiples. One technique of enabling the simulation of surface-related multiples is to use a free-surface boundary condition for finite-difference modeling in the waveform inversion algorithm to enable reflections from the top boundary (in this case the surface, such as a land or sea surface). Another technique of enabling the simulation of surface-related multiples is to provide an air-velocity zone above the top boundary, while keeping the absorbing boundary condition for the modeling. The absorbing boundary condition means that all seismic waves are not reflected from the boundary. However, provision of the air-velocity zone above the top boundary creates an artificial interface and allows for reflections from the top boundary such that surface-related multiples can be simulated.

Figure 2:
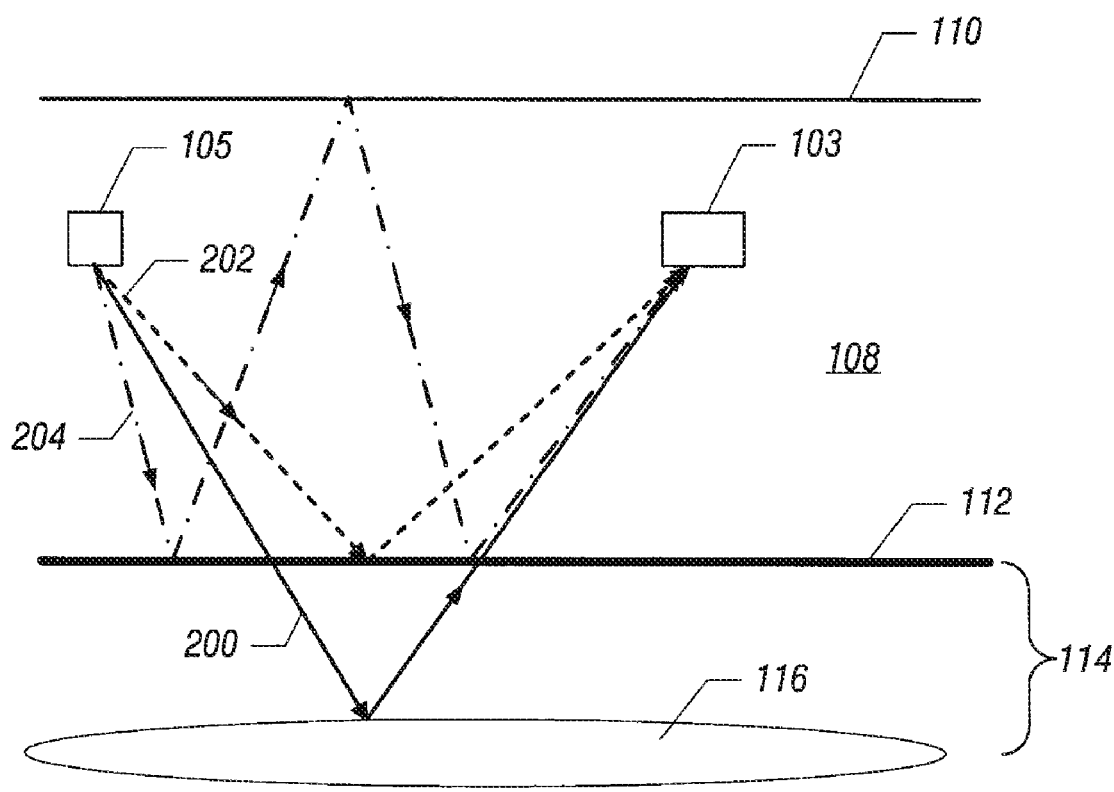
FIG. 2 illustrates reflections of seismic waves by various elements, including a subterranean structure, a sea floor, and an air-water interface.

FIG. 2 shows several different waveforms that can be propagated in response to seismic signals generated by a seismic source 105. A first propagation path of a seismic signal is primary propagation path 200. A seismic signal generated by the seismic source 105 travels generally downwardly into the subterranean structure 114 and is reflected by an interface of the resistive body 116 back generally upwardly toward a seismic receiver 103. A second propagation path 202 of a seismic signal is the path in which the seismic signal travels downwardly from the seismic source 105 to the sea floor 112, and reflects from the sea floor 112 toward the seismic receiver 103. A third propagation path 204 is from the seismic source 105 toward the sea floor 112, with a reflection back up to the sea surface 110 (the air-water interface), followed by further reflections from the sea surface 110 back downwardly to the sea floor 112, and back up again from the sea floor 112 to the seismic receiver 103. The seismic waves that follow propagation paths 204 (due to reflections from the top surface 110) are referred to as "surface-related multiples" that are detected by the seismic receiver 103 in addition to the primary seismic wave that is reflected from the resistive body 116 along the primary propagation path 200.

For land-based applications, surface-multiples can also be present, and include multiple reflections between the land surface and a subsurface reflector. The multiple reflections can be detected by a seismic receiver located on or below the land surface.

Figure 3:
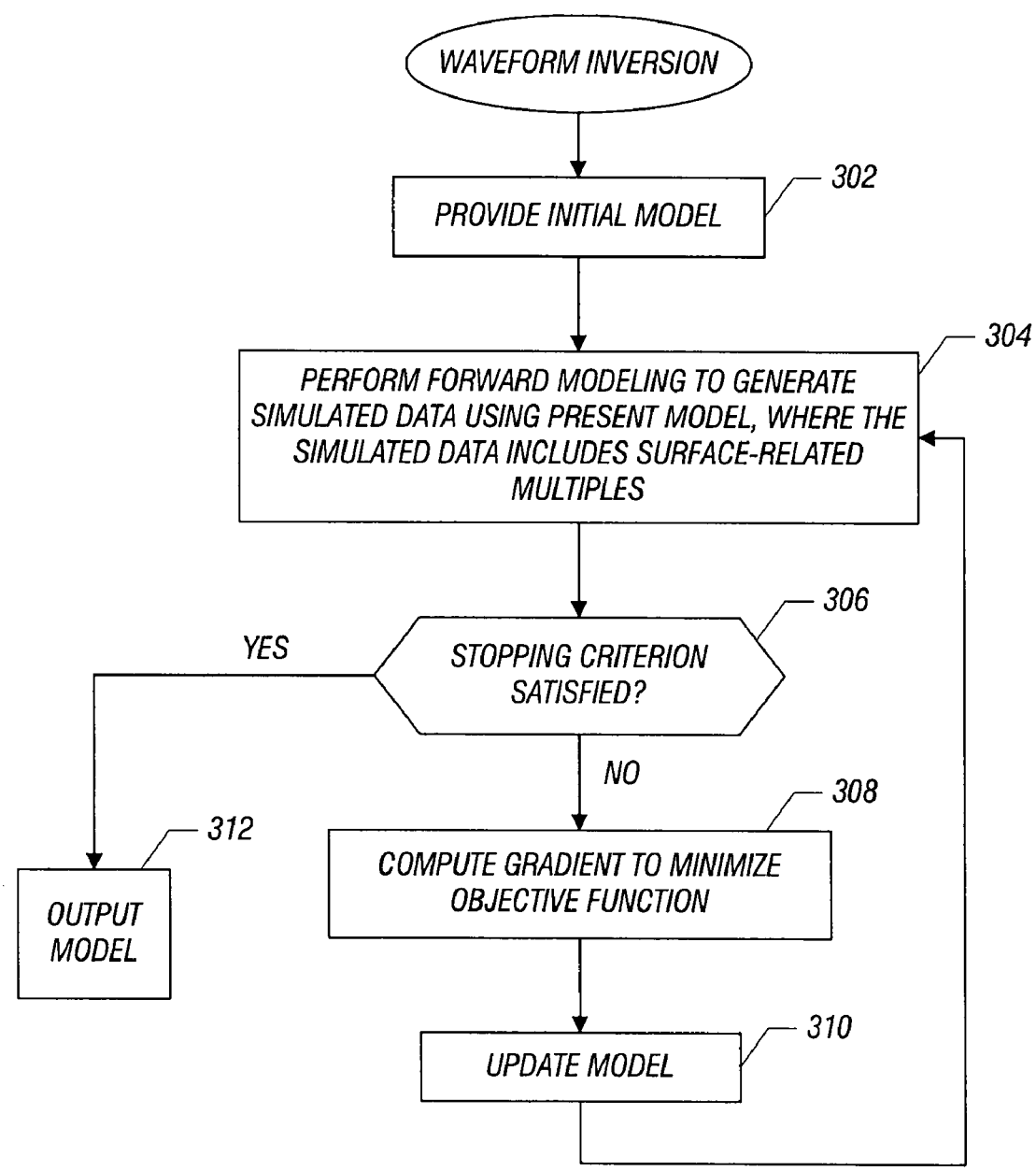
FIG. 3 is a flow diagram of a process of performing seismic waveform inversion, according to an embodiment.

FIG. 3 is a flow diagram of a process according to an embodiment of performing seismic waveform inversion. An initial model is provided (at 302) to enable simulation of seismic wave propagation. As noted above, one example of the model is a velocity-depth model. Next, forward modeling is performed (at 304) to generate simulated seismic data using the present model (which initially is the initial model provided at 302). In one embodiment, a finite-difference algorithm is used for forward modeling. The simulated data based on the forward modeling includes surface-related multiples. As noted above, generating simulated data that includes surface-related multiples can be accomplished using one of two techniques: (1) change the boundary condition to be a free-surface boundary condition; or (2) add an air-velocity zone in the model above the top boundary (the top surface, such as the air-water interface or the land surface).

In one embodiment, a constant-density frequency-domain acoustic-wave equation is used for the forward modeling, according to Eq. 1 below:

$$\left(\nabla^2 + \frac{\omega^2}{c^2(x)}\right)P(x, s, \omega) = -\delta(x-s)S(\omega). \quad \text{(Eq. 1)}$$

In Eq. 1 above, $P(x, s, \omega)$ represents the forward modeling solution, which in this case is the pressure field at the spatial location x, arising from a disturbance at the source location s. The pressure field $P(x, s, \omega)$ is also dependent upon frequency $\omega$. Also, in Eq. 1, $\nabla$ is the LaPlacian operator, c is the speed of an acoustic wave, and $\delta(x-s)S(\omega)$ represents a source function component. The pressure field $P(x,s,\omega)$ is considered one type of seismic data.

A simulated pressure field is represented as $P_{cal}(r,s)$, while an observed pressure field (based on measurements collected by a seismic receiver) is represented as $P_{obs}(r,s)$. Both the simulated pressure field $P_{cal}(r,s)$ and the observed pressure field $P_{obs}(r,s)$ contains surface-related multiples. Note that dependence upon frequency $\omega$ is assumed even though not explicitly set forth in $P_{cal}(r,s)$ and $P_{obs}(r,s)$. The pressure fields $P_{cal}(r,s)$ and $P_{obs}(r,s)$ are considered one type of simulated seismic data and observed seismic data, respectively. The difference between $P_{cal}(r,s)$ and $P_{obs}(r,s)$ is expressed as:

$$\Delta P(r,s) = P_{obs}(r,s) - P_{cal}(r,s). \quad \text{(Eq. 2)}$$

$\Delta P(r,s)$ represents a comparison (based on taking a difference) of the observed and simulated pressure fields. Based on $\Delta P(r,s)$, an objective function $$E = \frac{1}{2} \sum_s \sum_r \Delta P^*(r, s) \Delta P(r, s)$$

is defined, where * denotes complex conjugation. The objective function E is minimized to minimize differences between observed seismic data and simulated seismic data.

The waveform inversion process is an iterative process that loops through tasks 304, 306, 308 and 310 of FIG. 3 until a stopping criterion is satisfied, as determined (at 306). The stopping criterion can be based on a normalized value of the objective function, $$E = \frac{1}{2} \sum_s \sum_r \Delta P^*(r, s) \Delta P(r, s).$$

being less than some predefined threshold. The objective function E can be normalized with respect to the initial model. Other stopping criteria can also be specified.

Assuming that the stopping criterion has not yet been satisfied, the waveform inversion process computes (at 308) a gradient to minimize the objective function $$E = \frac{1}{2}\sum_s \sum_r \Delta P^*(r, s)\Delta P(r, s).$$

The gradient (referred to as the negative gradient) indicates the direction of decrease of the misfit function, represented by E, with respect to the variation in model parameters. If the model is represented by m(x), which is a function of spatial position x, then the negative gradient can be defined as:

$$g(x) = -\nabla_m E = -\frac{\partial E}{\partial m(x)}. \quad \text{(Eq. 3)}$$

The negative gradient is used to update (at 310) the model. At this point, the updated model is modified from the initial model. Based on the updated model, forward modeling according to 304 is performed to generate new simulated data (which also contains surface-related multiples). The tasks of 304-310 are repeated until the stopping criterion is satisfied, at 306. At that point, the present model can be output (at 312) for use by a user in performing various tasks, such as performing migration to generate an image of a portion of a subterranean structure.

Various benefits can be provided by some embodiments of the invention. As discussed above, labor and computing-intensive data pre-processing does not have to be performed for attenuating or removing surface-related multiples from observed seismic data. Also, by eliminating data pre-processing to attenuate surface-related multiples, artifacts that may appear as part of the attenuation process can be avoided to improve the quality of the inversion result. Also, by utilizing information in the surface-related multiples, the seismic inversion can provide increased quality in the result.

Figure 4:
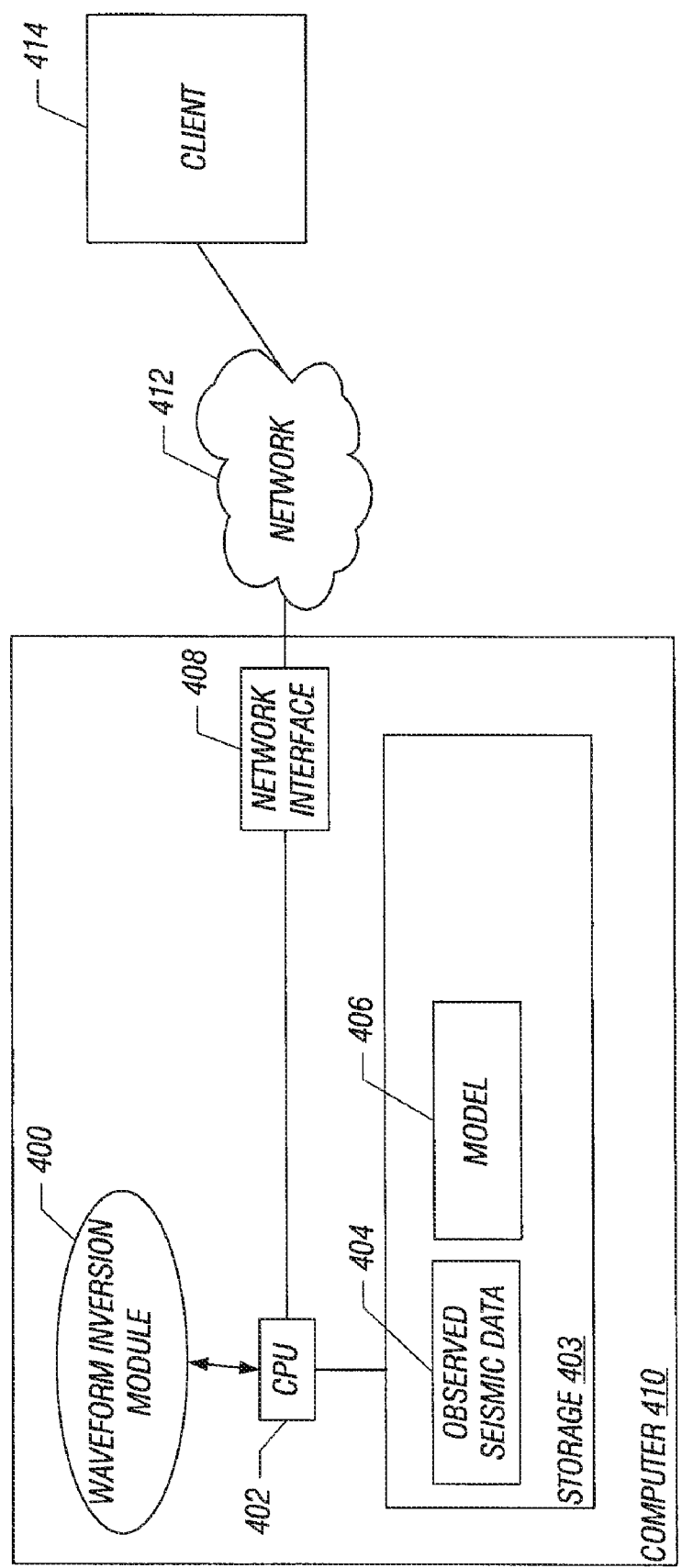
FIG. 4 is a block diagram of a computer including a waveform inversion module, according to an embodiment.

As depicted in FIG. 4, the waveform inversion process of FIG. 3 can be performed by a waveform inversion model 400, which can be a software module executable on one or more central processing units (CPUs) 402 of a computer 410. The CPU 402 is connected to a storage 403, which can store various data, including observed seismic data 404 that has been collected based on measurements by seismic receivers in the field. Model(s) produced by the waveform inversion module 400 can be stored as 406 in the storage 403.

In some cases, an updated model 406 can be communicated through a network interface 408 of the computer 410 and over a data network 412 to a client computer 414 for use by the client computer 414.

Instructions of software described above (including waveform inversion model 400 of FIG. 4) are loaded for execution on a processor (such as one or more CPUs 402 in FIG. 4). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of performing seismic inversion, comprising:
   providing a model representing a subterranean structure;
   generating simulated seismic data using the model, wherein the simulated seismic data includes surface-related multiples, wherein generating the simulated seismic data using the model is part of a forward modeling process, wherein providing the model comprises providing the model that has an air-velocity zone to enable the forward modeling process to simulate reflections of seismic waves from a surface above the subterranean structure; and
   iteratively updating the model based on comparing the simulated seismic data with observed seismic data collected by a seismic survey.

2. The method of claim 1, wherein generating the simulated seismic data including the surface-related multiples comprises generating the simulated seismic data including surface-related multiples due to multiple reflections of seismic waves from the surface that includes one of a land surface and an air-water interface.

3. The method of claim 1, further comprising receiving the observed seismic data, wherein the observed seismic data includes surface-related multiples, and
   wherein comparing the simulated seismic data with the observed seismic data comprises comparing the simulated seismic data including surface-related multiples with the observed seismic data including surface-related multiples.

4. The method of claim 1, wherein iteratively updating the model comprises:
   (1) modifying the model to provide a modified model;
   (2) generating simulated seismic data using the modified model;
   (3) comparing the simulated seismic data generated using the modified model with the observed data; and
   (4) in response to determining that a stopping criterion has not been satisfied based on the comparing, repeating steps (1)-(4).

5. The method of claim 4, wherein determining that the stopping criterion has not been satisfied comprises comparing a value of an objective function with a threshold.

6. The method of claim 1, wherein performing the forward modeling process comprises performing the forward modeling process with an absorbing boundary condition.

7. The method of claim 1, wherein iteratively updating the model comprises minimizing an objective function that takes into account differences between observed seismic data and simulated seismic data.

8. The method of claim 1, wherein the surface-related multiples comprise a seismic wave due to reflection from the surface.

9. An article comprising at least one computer-readable storage medium containing instructions that when executed cause a computer to:
provide a model representing a subterranean structure;
perform forward modeling to generate simulated seismic data using the model, wherein the simulated seismic data includes surface-related multiples, wherein providing the model comprises providing the model that has an air-velocity zone to enable the forward modeling to simulate reflections of seismic waves from a surface above the subterranean structure; and
iteratively update the model based on comparing the simulated seismic data with observed seismic data collected by a seismic survey.

10. The article of claim 9, wherein providing the model representing the subterranean structure comprises providing a velocity-depth model.

11. The article of claim 9, wherein the surface-related multiples comprise seismic wave reflections from the surface.

12. The article of claim 9, wherein the model is iteratively updated until a stopping criterion based on an objective function that takes into account differences between the simulated seismic data and the observed seismic data has been achieved.

13. A computer comprising:
a storage to store a model representing a subterranean structure, and observed seismic data that contains surface-related multiples representing reflections from a top surface above the subterranean structure; and
a processor to:
perform forward modeling to generate simulated seismic data using the model, wherein the simulated seismic data includes surface-related multiples, wherein the model has an air-velocity zone to enable the forward modeling to simulate reflections of seismic waves from the top surface; and
iteratively update the model based on comparing the simulated seismic data including surface-related multiples with observed seismic data including surface-related multiples.

* * * * *